(12) United States Patent
Janz et al.

(10) Patent No.: US 6,498,671 B1
(45) Date of Patent: Dec. 24, 2002

(54) REGENERATOR WITH RECONSTITUTION OF AN OPTICAL SIGNAL CARRIER WAVE

(75) Inventors: Christopher Janz, Nepean (CA); Hans Bissessur, Paris (FR); Fabrice Devaux, Marhouge (FR); Domonique Chiaroni, Antony (FR)

(73) Assignee: Alcatel, Paris (FR)

( * ) Notice: Subject to any disclaimer, the term of this patent is extended or adjusted under 35 U.S.C. 154(b) by 386 days.

(21) Appl. No.: 10/009,177
(22) PCT Filed: Jun. 6, 2000
(86) PCT No.: PCT/FR00/01542
§ 371 (c)(1), (2), (4) Date: Dec. 10, 2001
(87) PCT Pub. No.: WO00/76094
PCT Pub. Date: Dec. 14, 2000

(30) Foreign Application Priority Data

Jun. 8, 1999 (FR) .............................................. 99 07200

(51) Int. Cl.[7] .............................. G02F 1/00; G02F 1/03; G02F 1/07
(52) U.S. Cl. ...................... 359/237; 359/249; 359/245; 359/260
(58) Field of Search .................................... 359/249, 174, 359/245, 260, 276, 286, 180, 187; 385/1, 2; 372/94

(56) References Cited

U.S. PATENT DOCUMENTS

| | | | | |
|---|---|---|---|---|
| 5,016,990 A | * | 5/1991 | Dobson | ....................... 359/260 |
| 5,282,072 A | * | 1/1994 | Nazarathy et al. | ........... 359/157 |
| 5,781,327 A | | 7/1998 | Wickham et al. | ............ 359/249 |

FOREIGN PATENT DOCUMENTS

| | | |
|---|---|---|
| EP | 0 602 659 | 6/1994 |
| JP | 59 071028 | 4/1984 |

* cited by examiner

*Primary Examiner*—Georgia Epps
*Assistant Examiner*—Tim Thompson
(74) *Attorney, Agent, or Firm*—Oblon, Spivak, McClelland, Maier & Neustadt, P.C.

(57) ABSTRACT

An optical signal regenerator includes a mechanism for reconstituting an optical signal carrier wave. The optical signal is thus regenerated on the same wavelength as the incoming carrier wave.

20 Claims, 8 Drawing Sheets

REGENERATOR WITH RECONSTITUTION OF AN OPTICAL SIGNAL CARRIER WAVE

FIELD OF THE INVENTION

The invention is in the optical signal processing field. More particularly, the purpose of the invention is regeneration of an optical information transmission signal.

TECHNICAL BACKGROUND

FIG. 8 very diagrammatically shows a regenerator 20 in which a signal is input from a transmission line L. The function of the regenerator is to regenerate the signal while amplifying it, reshaping it, and putting it back into phase. This function is known under the name of the 3R reconstitution standing for "reamplification, reshaping, retiming". Regeneration may comprise solely some regeneration functions, for example reshaping or reamplification. The regenerator 20 comprises a detector 21 that converts the received optical signal into an electrical signal carrying the optical signal modulation, a clock reconstitution means 22 that reconstitutes the clock signal from the signal, a means 23 of reconstituting the shape of the signal modulation received by line L, and finally a modulator 24 receiving firstly a carrier wave from a local oscillator 100 shown in dotted lines and the reshaped electrical signal from the means 23 of reconstituting the modulated shape of the signal received by line L to give a reconstituted retransmitted signal at the output.

In this device 20, it is noted that the carrier wave of the retransmitted signal is reconstituted locally, and therefore can differ from the initial carrier wave by modifications to characteristics such as the wave length that might be slightly different even if the two wave lengths have the same nominal value, polarization and phase.

Another example embodiment is described in the U.S. Pat. No. 5,781,326 belonging to the applicant issued on Jul. 14, 1998 (EP 813 097 A1). The purpose of the invention described in this patent is to propose a fully optical regeneration device, in other words without any optical-electrical or electrical-optical conversion.

The device for shaping a binary input signal in the shape of a first optical wave modulated between low and high power amplitudes, comprises:

- a first stage to supply a modulating optical signal in the shape of a second optical wave with a determined wave length and modulated between first and second power amplitudes, as a function of the said input signal, the highest of the said first and second levels being stabilized to be only slightly dependent on fluctuations of the said low and high levels of the input signal, and
- a second stage comprising an interferometric structure coupled with the said first stage to receive the said modulating signal and designed to supply an output signal resulting from constructive or destructive interference of the first and second auxiliary waves when the power of the modulating signal is equal to the said first or second levels respectively.

Each of the first and second stages of this shaping device can be used separately to produce an output signal regenerated from the input signal. The first and second stages can naturally be cascaded as described in this patent to give an improved regenerated signal, in other words capable of starting from a poor quality modulated input signal and producing an output signal in which the high levels are stabilized with a constant optical power, and in which the low levels have a practically zero power while presenting a very high signal-to-noise ratio.

For a good understanding of the benefits of the invention in the device described in this patent, each stage of the device described in this patent is shown in FIG. 1 in this application.

The first stage is shown in part A and the second stage is shown in part B.

The first stage 61 receives an input optical signal E in the form of a continuous optical wave $\lambda e$ modulated in a binary manner.

The first stage 61 comprises an optical amplifier with a fiber 63 that receives the input signal E and supplies an amplified input signal AE to a clipping device 64. The clipping device 64 comprises a semiconductor optical amplifier OA, one face of which is coupled to a laser oscillator 66 supplying an intermediate carrier wave L. The other face of amplifier OA is connected to a circulator 5 comprising a first port into which the amplified input signal AE from the fiber amplifier 63 is input, and a second port from which it is injected into the amplifier OA. A third port in the circulator 65 supplies the signal B through a rejecter filter F adjusted to the wave length $\lambda e$ of the input signal E. The wave length $\lambda b$ of the intermediate wave L is chosen to be different from the wave length of signal E.

Signal B may constitute the regenerated signal or a modulating signal for the second stage represented in part B that will now be described.

The second stage 62 of the device in FIG. 1B comprises an interferometric structure 67 composed of two guide branches provided with semiconductor optical amplifiers OA1 and OA2 respectively. A first coupler K1 couples one end of each of these branches to a laser source 68 supplying an output carrier wave M with wave length $\lambda s$. A second coupler K2 is arranged so that the signal to be regenerated can be input into the first amplifier OA1. A third coupler K3 connected to the coupler K2 and to the second amplifier OA2 is arranged to supply an output signal S resulting from coupling of auxiliary waves AM1 and AM2 supplied by amplifiers OA1 and OA2 respectively. The waves AM1 and AM2 correspond to waves M1 and M2 output from coupler K1 and amplified by amplifiers OA1 and OA2 respectively.

Currents I1 and I2 are injected into amplifiers OA1 and OA2 respectively. According to a first option, these currents are adjusted such that the output signal S is the result of constructive interference between waves AM1 and AM2 when the power of the input signal is low, and is otherwise the result of destructive interference.

According to another option, the current I2 may be adjusted to a value I21 greater than I20 to obtain destructive interference when the power of the input signal is low, and constructive interference when it is high.

Regardless of the specific case, as shown in FIG. 1A or 1B or the case described in the patent mentioned above in which the signal B forms the input signal to the device shown in part B, the output wave length, as in the device described with reference to FIG. 8, is different from the input wave $\lambda e$. Similarly, the polarization and phase of the output wave vary with respect to the input wave.

U.S. Pat. No. 5,781,327 delivered to TRW inc. describes an electro-optical modulation system operating in a closed loop. The carrier optical wave is generated by an optical amplifier medium 12 shown in FIGS. 1 and 5, and 32 in FIG. 3. This amplifying medium is pumped by a continuous wave, which is the continuous wave at the output from the amplifier medium connected to the input of this medium through the loop.

This cycle of the loop comprises means 10 of modulating the continuous wave output from the amplifier optical medium. The loop has a loop output for the modulated optical wave. The loop cycle comprises filter or demodulation means to reduce the width of the pumping wave band. This thus improves the optical efficiency of the overall device (column 2, row 43). In particular, it avoids the need to reinput unwanted resonance into the modulator that would disturb modulation (end of claim 1 in this patent).

The amplifying optical medium in this patent thus behaves like a local oscillator comprising a reaction loop, in which part of the output is returned to the input. This patent is mentioned because it reveals some filter means that are used in the invention that will be described later.

In regeneration devices, variations in the phase, wave length or polarization due to local generation of the beat wave, can introduce some disadvantages particularly in a WDM (Wavelength Division Multiplex) transmission system. Similarly, devices for coherent processing of the optical signal in which the polarization of the received signal is not known are shown in FIG. 9. In the device 40 shown in this figure, a polarized carrier wave TE and a polarized carrier wave TM are injected into the signal arriving on a line L using local oscillators 28, 29 and mixers 26, 27 respectively, to be sure that it beats with a wave with the same nominal wave length as a signal carrier wave. Thus, the signal carried by the carrier wave is detected. The electrical signals output from the mixing detectors 26 and 27 are then added in a known manner in an adder 31.

BRIEF DESCRIPTION OF THE INVENTION

The invention is intended to make improvements to a transmission line, and in particular it is intended to keep the wave length of the carrier wave constant throughout the length of a transmission line. According to the invention, this is done by substituting a continuous wave extracted from the modulated carrier wave at an input to a signal regenerator transmitted through the said transmission line, to replace the continuous wave generated locally by a local oscillator. If each of the regenerators is conform with the invention, then the wave length of the initial carrier wave is conserved with its phase and its polarization throughout the length of the transmission line. When it is said that the phase and the polarization are conserved, the meaning is that the phase shift or the polarization shift with respect to the transmitted wave is constant.

This conservation has advantages in the case of a WDM transmission, but also advantages for optical noise on the line.

Thus, the invention relates to an optical telecommunication regenerator, the regenerator having:

an optical input to receive a continuous optical wave carrying a modulation signal, from another regenerator or a remote transmission source through an optical transmission line (L), means of generating a pure optical wave, a modulator receiving a modulation representative of the modulation received at the input, an output from the modulator being coupled to an output from the regenerator, this regenerator being characterized in that the means of generating the pure optical wave are composed of extraction means into which the modulated optical wave from the said other regenerator or the said remote transmission source is input, these means processing this wave to reconstitute the carrier wave.

In their simplest form, the means of extraction of the carrier wave comprise low pass filter means into which the modulated signal is input, and which output the continuous optical wave generated by the generator. The terms high pass and low pass filters refer to low or high frequencies with respect to the base band of the carried signal. The low pass filter could be made using a Fabry-Perot cavity in which one of the nominal resonant frequencies is equal to the nominal frequency of the carrier wave received by the regenerator, this cavity receiving the modulated signal as input and producing a continuous optical wave as output. Depending on the nature of the original signal and the quality to be obtained for the regenerated carrier wave, it would also be possible to have a high pass filter into which the optical wave from the low pass filter is input, in this case this optical wave is a first intermediate continuous wave instead of the output continuous wave. The high pass filter eliminates any low frequency components that are still present in this intermediate continuous wave. In this case the output signal from the high pass filter forms the continuous optical wave generated by the means of generating a pure optical wave. It will be seen later that the high pass filter may be constituted by a semiconductor optical amplifier.

BRIEF DESCRIPTION OF THE DRAWINGS

Example embodiments and examples of use of the invention and the results of tests carried out using a device according to the invention will now be described with reference to the attached drawings in which:

FIG. 4 comprises a part A diagrammatically showing the device, and a part B that is a curve provided to explain its operation;

Elements with the same function have the same reference number in all figures.

DESCRIPTIONS OF EMBODIMENTS OF THE INVENTION

Figure 1:
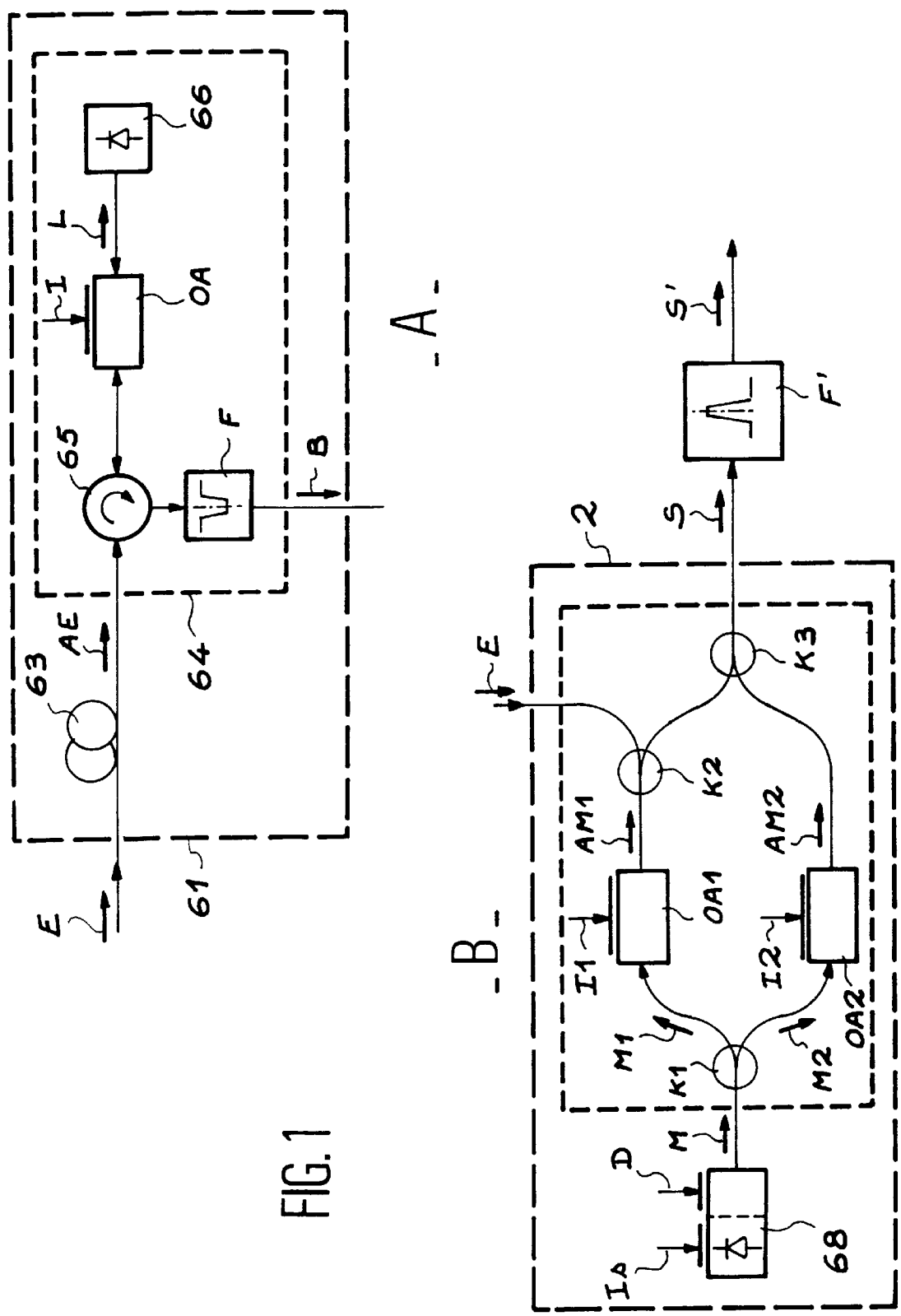
FIG. 1, already commented upon, comprising parts A and B, represents examples of known regenerators.
Figure 2:
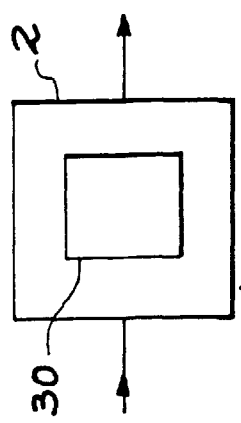
FIG. 2 represents the simplest embodiment of a continuous wave generator that can be used with the invention.
Figure 3:
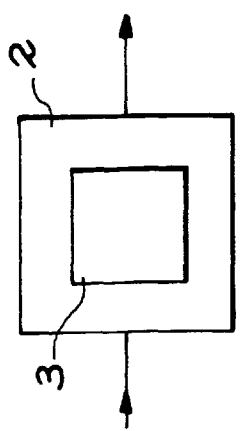
FIG. 3 shows a particular mode of the simplest embodiment of the continuous wave generator as shown in FIG. 2.

FIGS. 2 to 7 show a device 1 comprising means (2) of extracting a pure continuous wave from a continuous wave carrying a modulation received on an input to device 1, and originating from a remote source through a transmission line L. Means 66 and 68 in FIG. 1, means 100 in FIG. 8 and means 26 to 29 and 31 may advantageously be replaced by a corresponding device according to any one of FIGS. 2 to 7. In its simplest embodiment shown in FIG. 2, the means 2 are represented by a low pass filter 3. This low pass filter may be in the form of a Fabry-Perot cavity 30 as shown diagrammatically in FIG. 3. This cavity 30 has one of its nominal resonant frequencies equal to the carrier frequency of the received modulated signal. It will be advantageous when the received signal is a wave length multiplexed signal, to provide a cavity for which the resonant frequencies comprise several or even all wave lengths of the multiplexed signal. It is thus possible for each of the signal carrier waves in the multiplexed signal to be at the output from the cavity. The carrier wave is reproduced due to the fact that the filter, for example the cavity, has a very narrow pass band around the carrier, and consequently only the carrier passes. Frequency components introduced by the modulation are not transmitted.

Figure 5:
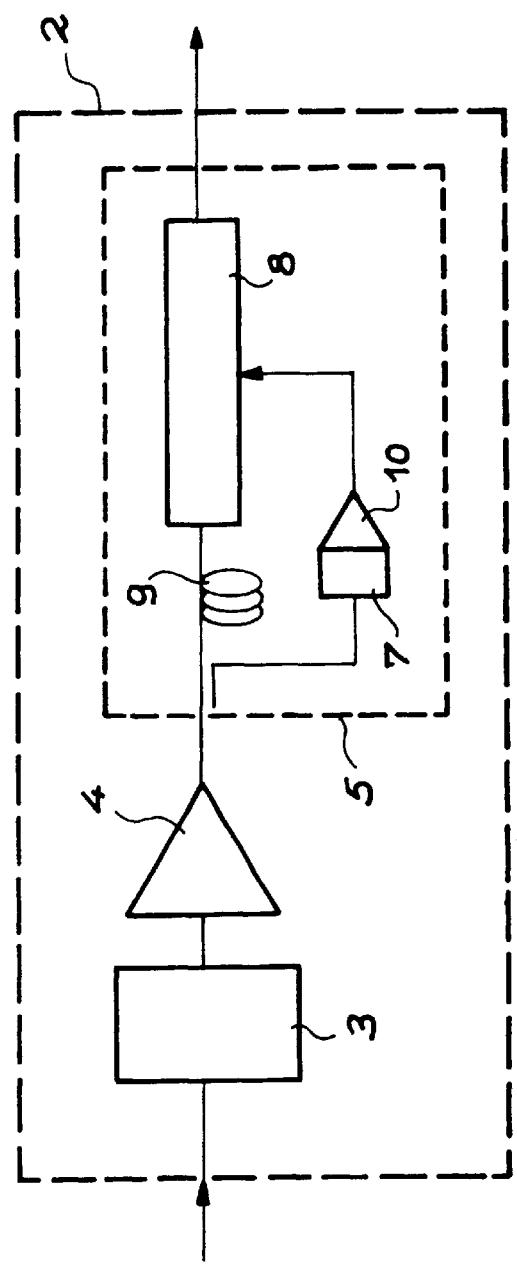
FIGS. 4 and 5 show an embodiment of a continuous wave generator that can be used with the invention in which a high pass filter is installed in series with the low pass filter.

However, if it is required to further filter the carrier at the output from filter 3, 30 considering the modulated signal and the quality to be obtained for the carrier, a high pass filter 5 can be provided like that shown in FIGS. 4 to 7. In this case, the signal at the output from the low pass filter 3, 30 can no longer be considered to be the reproduced carrier wave. For logical reasons of vocabulary, the various signals forming the carrier wave in a more or less pure shape, will be called "intermediate continuous waves". Depending on the number of devices used to improve this wave present at the output of the low pass filter 3, 30, there may be a first intermediate continuous wave or a second intermediate continuous wave or even a third intermediate continuous wave. The high pass filter is designed to eliminate low frequency components that further pollute the carrier at the output from the low pass filter 3, 30. Two embodiments of this filter are shown, one in FIG. 4 and the other in FIG. 5. In the form shown in FIG. 4, the filter is a semiconductor optical amplifier 6. Operation is explained in the curve representing the amplifier gain in decibels as a function of the optical power of the input signal shown as the abscissa. This gain has a constant part for a power range around a nominal amplifier power and then drops when the optical input power increases. If an appropriate prior amplification is used to bring the power amplitude of the first intermediate continuous wave within the range of power values in which the gain is reducing, surrounded by the two vertical dashed lines in FIG. 4, part B, the fluctuations in the amplitude of the output power will be strongly attenuated or even eliminated. The high power amplitudes will only be slightly amplified since the amplification gain will be small for them, however low power amplitudes will be amplified much more strongly, since they will be located in an area with a higher gain. Therefore the amplitude of the first intermediate continuous wave will be more constant, which also corresponds to a frequency with a spectrum closer to the spectrum of a pure wave. This embodiment has the advantage that it can be made on a single component that only performs optical signal processing. FIG. 5 shows another embodiment of the high pass filter on the output side of the low pass filter 3, 30. In this embodiment, the first intermediate continuous wave is input into an electro-optical modulator 8 through a delay device 9. The first intermediate continuous wave is also input into an electro-optical inverter detector 7. An electrical signal present at the output from the inverter detector 7 representing the residual modulation inverse to the modulation of the first intermediate continuous wave is applied to the modulator 8. If the delay 9 is suitably chosen, in other words if it is equal to the time necessary for detection in the loop comprising the inverter detector 7 and possibly an amplifier 10, the first intermediate continuous wave is modulated in the modulator 8 by an electrical signal from the detector 7 that is in phase opposition with the residual modulation of the first intermediate continuous wave. The continuous wave at the output from the modulator 8 is thus free of the residual modulation present at the output from the low pass filter 3, 30. Note that before it is input into the high pass filter 5, the first intermediate continuous wave may or may not be amplified by means of an amplifier 4. Similarly, at its output from the inverter detector 7, the first intermediate continuous wave may or may not be amplified by means of an amplifier 10. The need for either or both of the amplifiers 4 and 10 will be judged by a person skilled in the art as a function of the amplitude of the first intermediate continuous wave and the levels required by the modulator 8 and the inverter detector 7.

Figure 6:
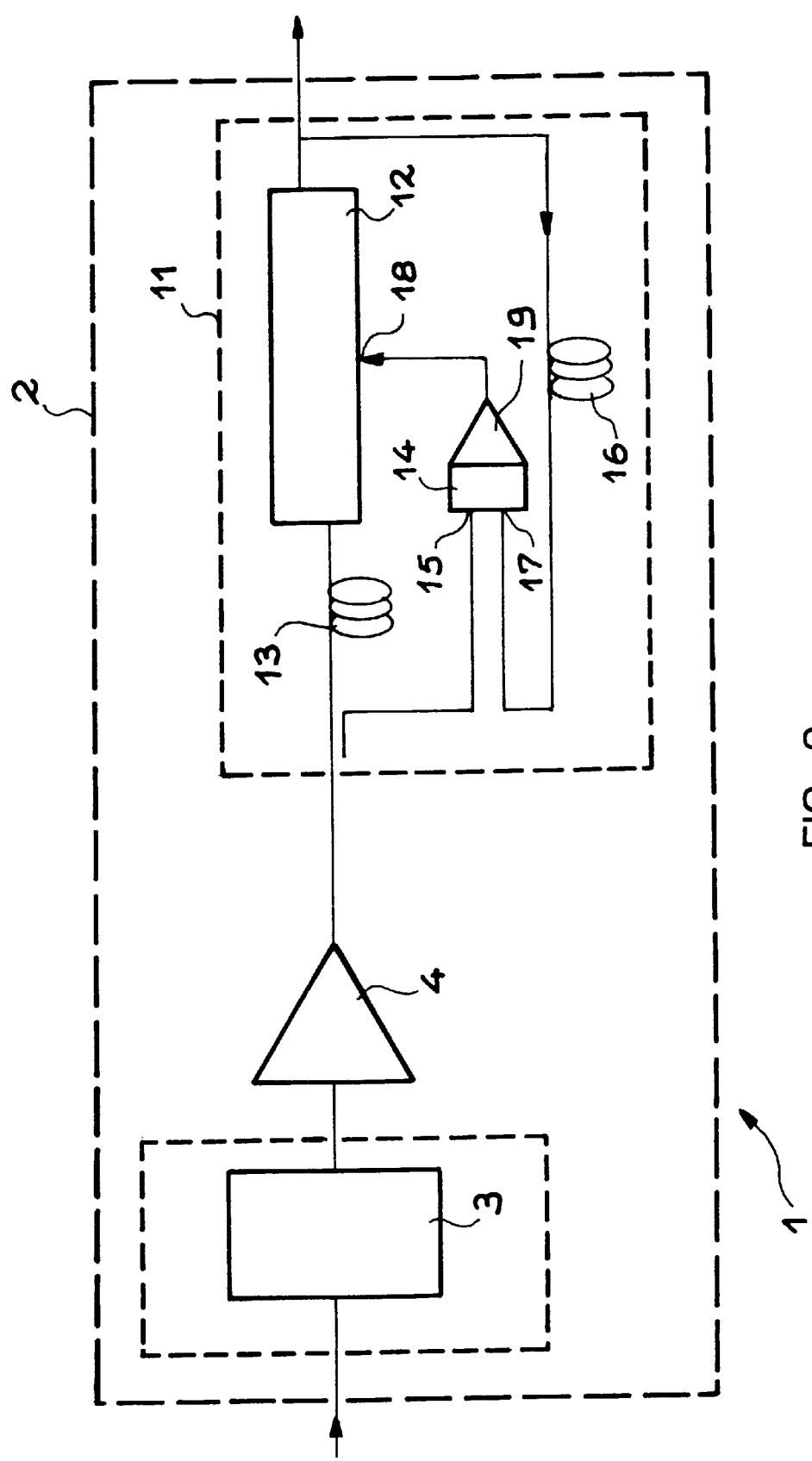
FIG. 6 shows an embodiment of a continuous wave generator that can be used with the invention in which a phase filter is installed in series with the low pass filter.

An improvement to the first intermediate continuous wave at the output from the low pass filter 3, 30 may also be made by filtering any residual phase modulation. As shown in FIG. 6, this can be done by introducing a phase filter 11 on the output side of the low pass filter 3, 30. In the embodiment shown as an example in FIG. 6, the first intermediate continuous wave from the low pass filter 3, 30 is input into a phase modulator 12, through a first delay 13, for example in the form of an optical fiber length. A modulation signal is input into this modulator in the form of an electrical signal from a phase comparator 14. The first intermediate continuous wave is input to a first input 15 of the phase comparator 14 and a wave delayed by a second delay 16 is input to a second input 17. This wave that reaches the second input 17 through the delay 16 is the wave output from modulator 12. In this case, this wave forms the continuous optical wave generated by the generator 1. The electrical modulation signal from the phase comparator 14 modulates the first intermediate continuous wave in opposition to the residual phase modulation such that any residual phase modulation at the output from the modulator 12 is eliminated from this first intermediate continuous wave, that thus forms the continuous wave generated by the generator 1. Naturally, as in the case of the high pass filter 5, before it is input into the phase filter 11, the first intermediate continuous wave may or may not be amplified by means of an amplifier 4. Similarly, at its output from the phase comparator 14, the detected electrical signal with its phase inverted may or may not be amplified by means of an amplifier 19. The need for either or both of the two amplifiers 4 and 19 will be determined by a person skilled in the art, depending on the amplitude of the first intermediate continuous wave and, in the example shown in FIG. 6, the amplitudes required by the phase modulator 12 and the phase comparator 14.

Figure 4:
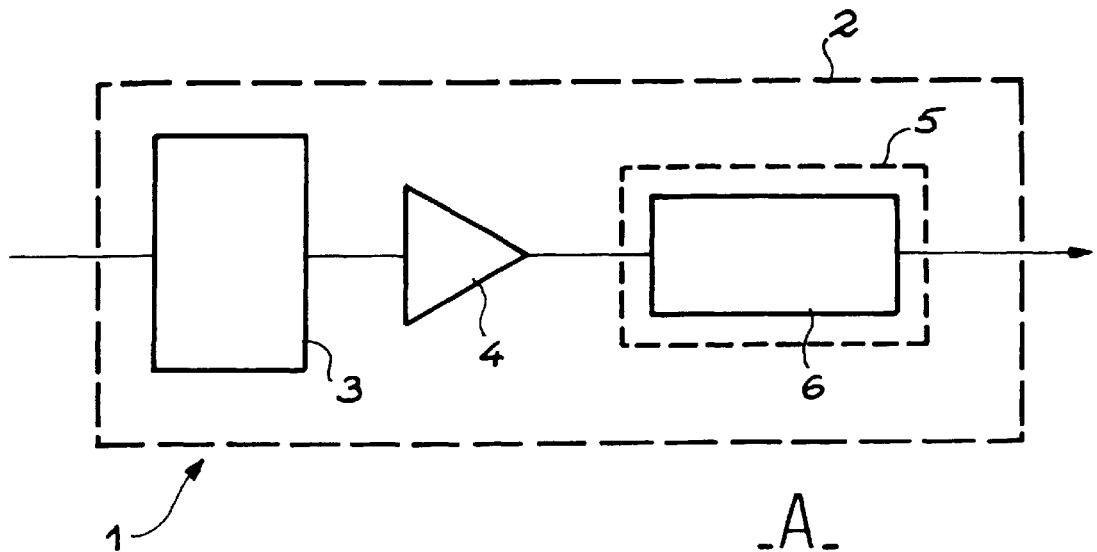
Figure 4:
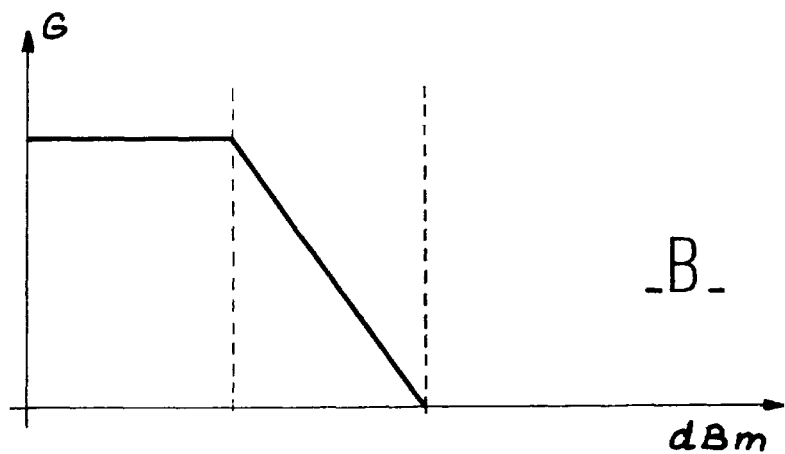
Figure 7:
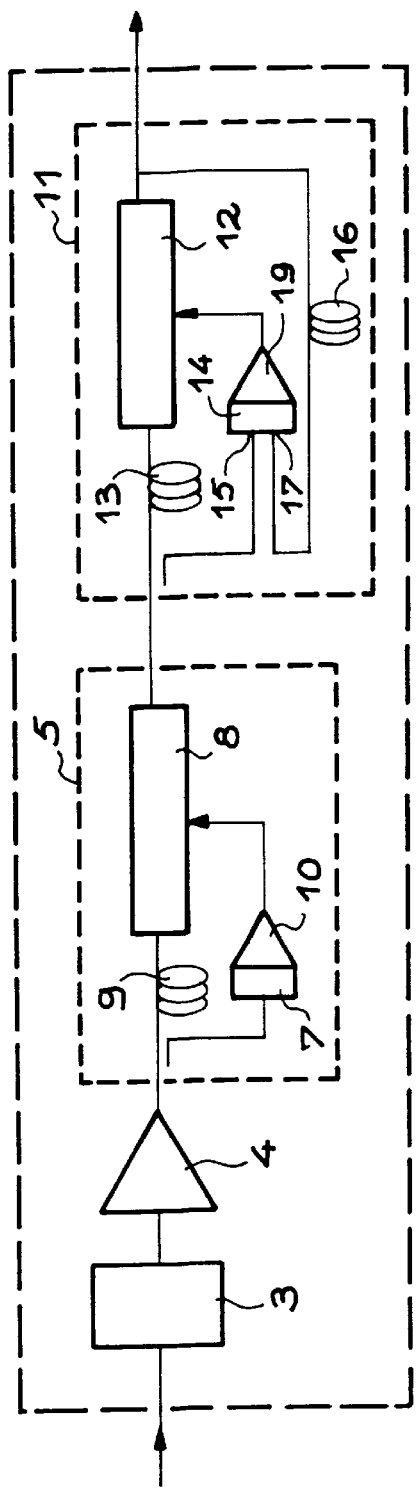
FIG. 7 shows an embodiment of a continuous wave generator that can be used with the invention in which a high pass filter, and then a phase filter, are installed in series on the output side of the low pass filter.

In the embodiment shown in FIG. 7, the high pass filter 5 as shown for example in FIG. 4A or 5 is followed by a phase filter 11 like that shown as an example in FIG. 6. In this case, the continuous wave at the output from high pass filter 5 becomes the second intermediate continuous wave, the continuous wave generated by the generator 1 being present in this case at the output from phase filter 11. The operation of each of the filters 5, 11 is the same as the operation described above with reference to FIGS. 4, 5 and 6 respectively, and will not be described again. The fact that the high pass filter 5 and the phase filter 11 are put in series eliminates residual amplitude and phase modulations from the first and the second intermediate continuous waves respectively.

Figure 8:
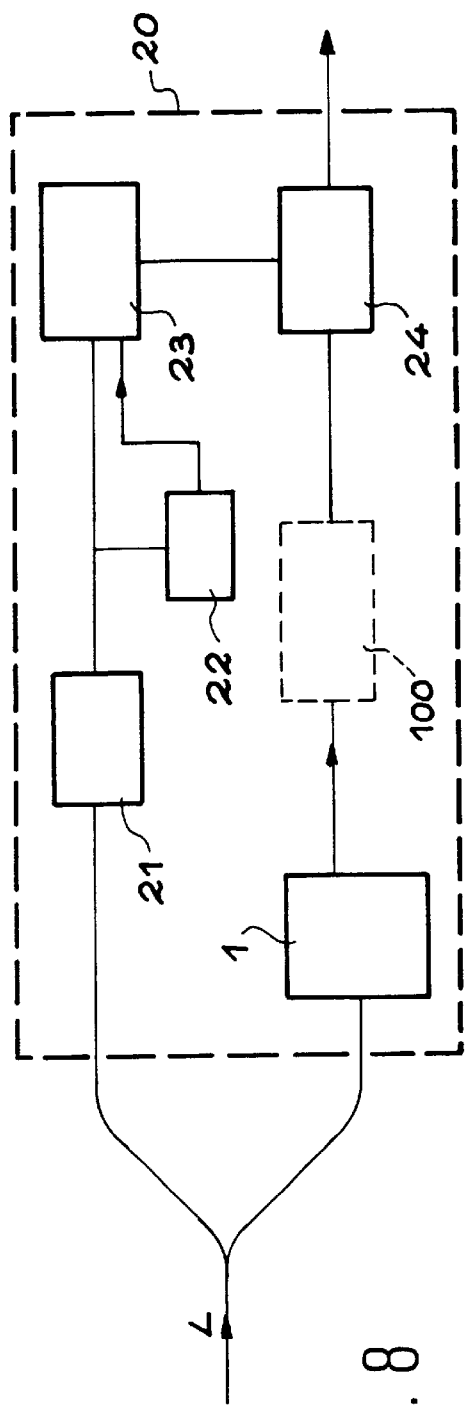
FIG. 8, already partly commented upon, illustrates modifications to be made to a known device to make it into a regenerator according to the invention.

Examples of the use of a continuous wave generator 1, like that shown for example in FIGS. 2 to 7, will now be commented upon in relation to FIGS. 1 and 8 to 10. In the regenerators shown in parts A and B in FIG. 1, the continuous wave generators 66, 68 may be replaced by a generator 1 like that described in relation to FIGS. 2 to 7 thus leading to a regenerator according to the invention. FIG. 8 already commented upon shows another regenerator 20 like those used in optical telecommunications, to regenerate a signal weakened, for example, by the distance through which it has already passed. As explained above, this signal may be regenerated in 3R form. Retransmission of this signal would require generation of a carrier wave that, as we have seen, is generated by a local oscillator 100 shown in dashed lines. Advantageously, the local oscillator 100 shown in dashed lines in FIG. 8 may be replaced by a continuous wave generator 1 such as that shown in FIGS. 2 to 7. The main advantage provided by this replacement is that it conserves exactly the same wavelength for the retransmitted signal as for the transmission wavelength of the first signal transmitter. The possible disadvantage is due to the fact that spontaneous transmission noise present in the carrier band is conserved. However it will be noted that this noise is only present in a very narrow band around the pure frequency of the carrier since the other parts of the signal received by the regenerator 20 have been filtered. As we will see later, this noise does not significantly increase the total value of the signal to noise ratio.

Figure 9:
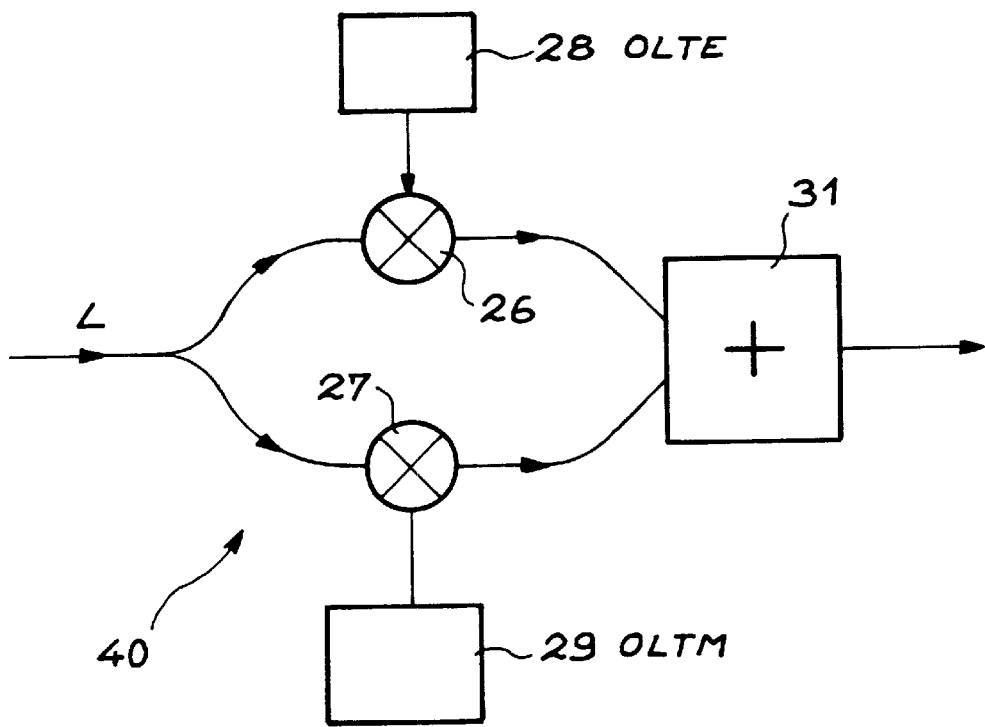
FIG. 9, already commented upon, shows a device according to prior art for local generation of the carrier comprising polarizations TE and TM.
Figure 10:
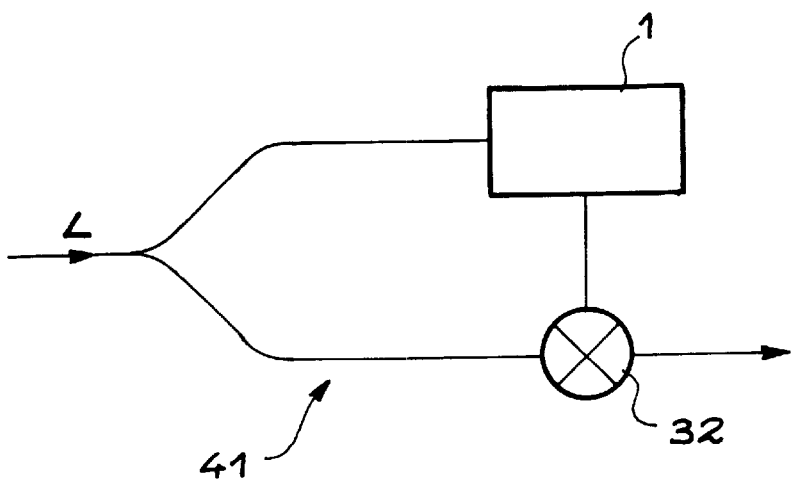
FIG. 10 illustrates modifications to be made to the known device shown in FIG. 9 to add a device to it according to one of FIGS. 2 to 7.

Another example used will now be commented upon with relation to FIGS. 9 and 10. FIG. 9 already commented upon shows a part 40 of a known device designed to perform processing on a signal incoming to a line L. It could typically be part of a coherent receiver. The signal input on the line is composed of a modulated carrier wave. In this device, the signal is mixed with two carrier waves TE and TM in two mixer detectors 26 and 27 into which are input carrier waves TE and TM from local oscillators 28 and 29 respectively, in order to be sure that a detection beat can be successfully generated between a locally produced wave at the nominal wave length of the carrier, and the signal. The electrical detection signals present at the output from mixers 26, 27, are then added into an adder 31. With a few known precautions about the gains of the two detectors 26, 27, the signal detected at the output from adder 31 is independent of the fluctuations in the polarization of the signal present on line L. As shown in FIG. 10, the part 40 of the device may advantageously be replaced by a part of device 41 comprising a carrier wave generator 1 according to one of FIGS. 2 to 7 and a single mixer detector 32. The modulated signal from the line L and the reconstituted carrier wave generated by the device 1 are input into the mixer detector 32. The difference in polarization, if any, between polarization of the carrier wave incoming on line L and the reconstituted carrier wave at the output from device 1 according to the invention, is constant. Consequently, with the addition of known means not shown on the input side of one of the two inputs to the mixer detector 32 to compensate for the rotated polarization, it is certain that the signals present at the input to the mixer detector 32 have the same polarization, and obviously the same wavelength.

Figure 11:
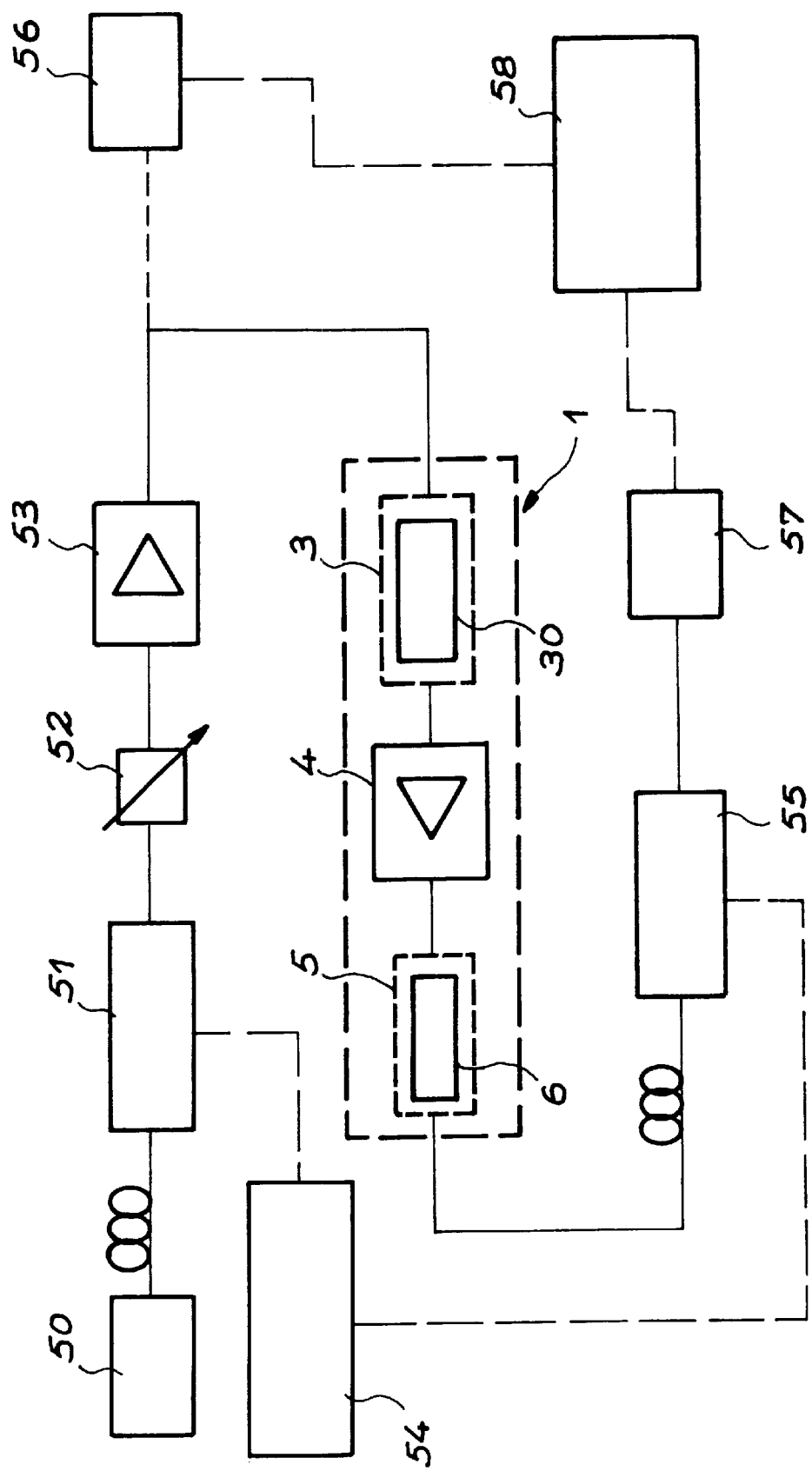
FIG. 11 diagrammatically shows an experimental set up designed to carry out tests on the invention.
Figure 12:
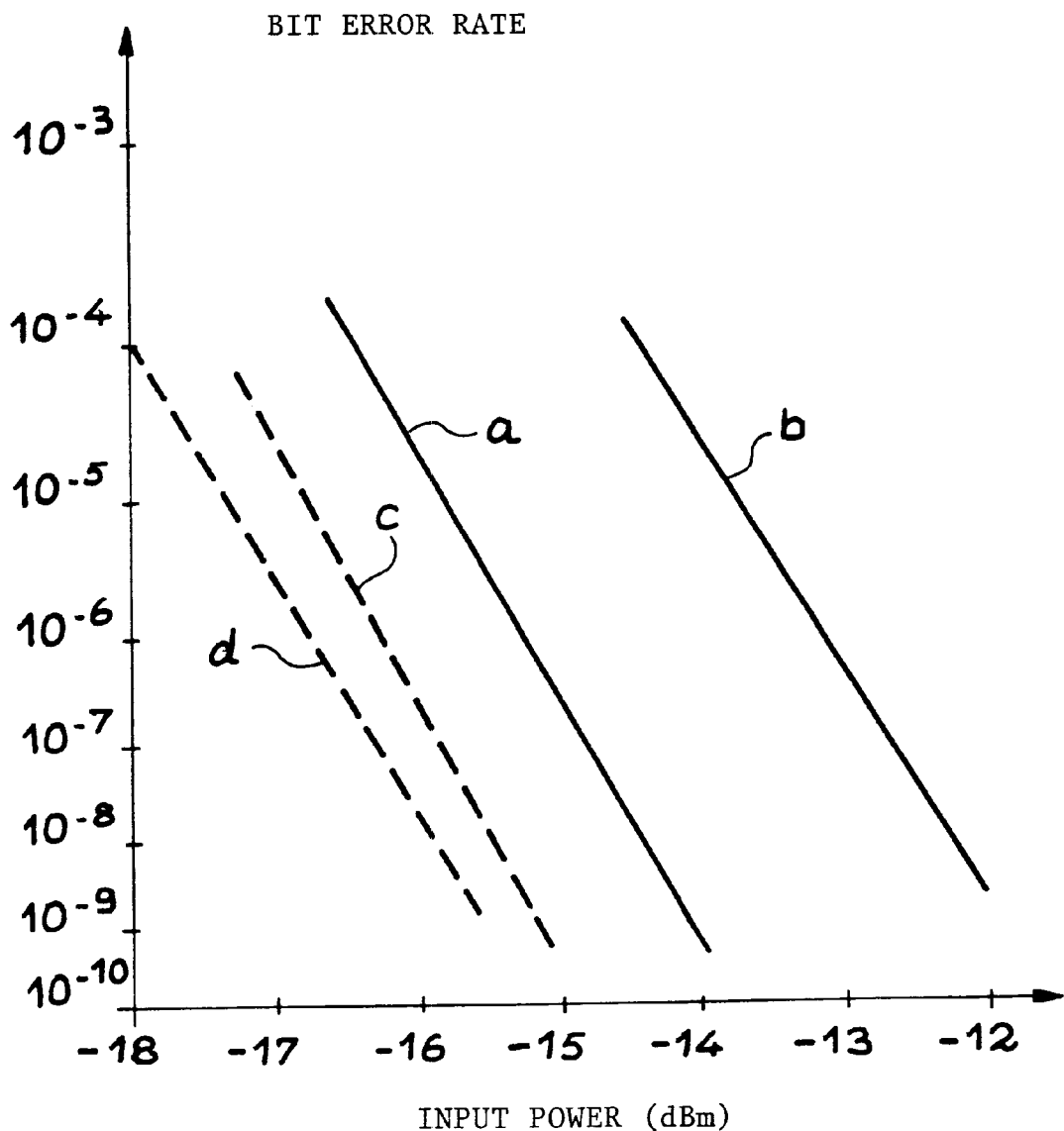
FIG. 12 contains curves showing the results of tests on the invention carried out with the experimental set up shown in FIG. 11.

Tests of a regenerator comprising a generator 1 will now be commented upon with reference to FIGS. 11 and 12. FIG. 11 diagrammatically shows an experimental setup intended to carry out tests on the invention. FIG. 12 shows curves of results of tests on the invention made with the experimental setup shown in FIG. 11.

With reference to FIG. 11, a single generator 54 of a pseudo random binary sequence is used as a modulation signal firstly for a modulator 51 forming part of what could be considered as being an initial transmission system and secondly a second modulator 55 forming part of a device that could be considered as being a regenerator. A carrier wave generated by a distributed feedback laser oscillator is input into the first modulator 51. This carrier wave is modulated by the pseudo random binary sequence generator 54. The modulator 51 powers a generator 1 according to one of FIGS. 2 to 7 represented in the form of a block shown in dashed lines, through an adjustable attenuator 52 designed to simulate an attenuation due to a distance traveled, and an amplifier 53. In the configuration used for the tests, the generator 1 comprises a low pass filter 3 in series in the form of a Fabry-Perot cavity 30, an amplifier 4 and a high pass filter 5 in the form of a semiconductor optical amplifier 6. The carrier wave reconstituted at the output from generator 1 is input to the second modulator 55 and is therefore modulated by the output signal from the pseudo-random binary sequence generator 54. Signals from modulators 51 or 52 are input into receivers 56 and 57 respectively, and the detected signals are compared in an error detector 58.

Measured error rates are shown in curves a, b, c and d in FIG. 12. These curves show the error rates between output signals from receivers 56 and 57 respectively, and the modulation signal produced by the pseudo-random binary sequence generator 54. Curves a and b show error rates as a function of the input powers, on signals present at the output from receiver 56. Signals generated by the pseudo random sequence generator 54 had sequences with a length of $(2^7-1)$ bits and an optical extinction rate at the output from the modulator 51 equal to 7 dB. For curve a, the signal to noise ratio is 44 dB, and it is 25 dB for curve b. The values of the signal to noise ratios indicated in this test report are always measured for frequency band widths corresponding to a wave length variation equal to 0.1 nanometers about the central wavelength. Bit error rates shown on curves c and d represent bit error rates for the signal present at the output from receiver 57, in other words for a signal for which the carrier used is a carrier produced by a device 1 according to the invention as shown in FIG. 11. Curve c shows the bit error rate when the carrier is extracted when the signal to noise ratio is 44 dB, and curve d shows the corresponding value when the signal to noise ratio is 25 dB.

In both cases, the signal generated using the reconstituted carrier wave had a standard sensitivity for the receiver used equal to about 15.5 dBm for a bit error rate equal to $10^{-9}$. These results were obtained with sufficient power to drive the semiconductor optical amplifier 6 in the input power range in which the gain reduces with the input power.

What is claimed is:

1. Optical telecommunication regenerator, comprising:
    an optical input to receive a pure optical wave carrying a modulation signal, from another regenerator or a remote transmission source through an optical transmission line,
    means of generating the pure optical wave,
    a modulator receiving a modulation command representative of the modulation received at the input, this modulator receiving the pure optical wave from the generating means, an output from the modulator being coupled to an output from the regenerator, wherein the means of generating the pure optical wave is composed of extraction means into which the modulated optical wave from the other regenerator or the remote transmission source is input, the extraction means processing this wave to reconstitute the carrier wave.

2. Regenerator according to claim 1, wherein the means of extracting the carrier wave comprise low pass filter means into which the modulated signal is input and from which the pure optical wave generated by the extraction means is output.

3. Regenerator according to claim 2, wherein the low pass filter means comprises a Fabry-Perot cavity for which one of nominal resonant frequencies is equal to a nominal frequency of the carrier wave input to the generating means, this cavity receiving the modulated signal as an input and producing the pure optical wave generated by the extraction means as an output.

4. Regenerator according to claim 2, wherein the extraction means further comprises a high pass filter into which the optical wave from the low pass filter is input, this optical wave becoming a first intermediate pure wave eliminating an output signal from the high pass filter forming the pure optical wave generated by the extraction means from low frequency components of this intermediate pure wave.

5. Regenerator according to claim 3, wherein the extraction means further comprises a high pass filter into which the optical wave from the low pass filter is input, this optical wave becoming a first intermediate pure wave eliminating an output signal from the high pass filter forming the pure optical wave generated by the extraction means from low frequency components of this intermediate pure wave.

6. Regenerator according to claim 4, wherein the high pass filter comprises a semiconductor optical amplifier.

7. Regenerator according to claim 5, wherein the high pass filter comprises a semiconductor optical amplifier.

8. Regenerator according to claim 4, wherein the high pass filter comprises an inverter photodetector into which the intermediate pure wave from the low pass filter is input, and which outputs an electrical modulation signal, and an intensity modulator into which the intermediate pure wave output from the low pass filter and the electrical modulation signal from the inverter photodetector are input through a delay means, thus modulating the delayed intermediate pure wave to produce the pure optical wave generated by the extraction means, at the output from the modulator.

9. Regenerator according to claim 5, wherein the high pass filter comprises an inverter photodetector into which the intermediate pure wave from the low pass filter is input, and which outputs an electrical modulation signal, and an intensity modulator into which the intermediate pure wave output from the low pass filter and the electrical modulation signal from the inverter photodetector are input through a delay means, thus modulating the delayed intermediate pure wave to produce the pure optical wave generated by the extraction means, at the output from the modulator.

10. Regenerator according to claim 8, wherein the high pass filter comprises a first amplifier into which the detected signal from the inverter photodetector is input, and which outputs the electrical signal modulating the delayed intermediate pure wave received by the modulator.

11. Regenerator according to claim 9, wherein the high pass filter comprises a first amplifier into which the detected signal from the inverter photodetector is input, and which outputs the electrical signal modulating the delayed intermediate pure wave received by the modulator.

12. Regenerator according to claim 8, wherein the high pass filter is coupled to the low pass filter through a second amplifier amplifying the intermediate pure wave from the low pass filter.

13. Regenerator according to claim 10, wherein the high pass filter is coupled to the low pass filter through a second amplifier amplifying the intermediate pure wave from the low pass filter.

14. Regenerator according to claim 2, wherein the extraction means further comprises a phase filter into which the optical wave from the low pass filter is input, in this case this optical wave becoming a first intermediate pure wave, eliminating residual phase modulation from this first intermediate pure wave, and producing a signal output from the phase filter constituting the optical pure wave generated by the extraction means.

15. Regenerator according to claim 3, wherein the extraction means further comprises a phase filter into which the optical wave from the low pass filter is input, in this case this optical wave becoming a first intermediate pure wave, eliminating residual phase modulation from this first intermediate pure wave, and producing a signal output from the phase filter constituting the optical pure wave generated by the extraction means.

16. Regenerator according to claim 14, wherein the phase filter comprises a phase modulator into which the first intermediate pure wave is input through a first delay means, and which outputs the pure optical wave generated by the extraction means, a phase comparator also receiving the first intermediate pure wave on a first input and the pure optical wave generated by the extraction means through a second delay means on a second input, and outputting an electrical signal representing a phase modulation, an electrical output signal from the phase detector being coupled to a modulation input on the phase modulator.

17. Regenerator according to claim 14, wherein the phase filter further comprises an amplifier into which the electrical signal from the phase comparator is input, this comparator being coupled to the phase modulator through this amplifier.

18. Regenerator according to claim 4, wherein the extraction means further comprises a phase filter into which the optical wave from the high pass filter is input, this optical wave in this case becoming a second intermediate pure wave, the phase filter eliminating residual phase modulation from this second intermediate pure wave, and producing a signal output from the phase filter constituting the pure optical wave generated by the extraction means.

19. Regenerator according to claim 18, wherein the phase filter comprises a phase modulator into which the second intermediate pure wave is input through a first delay means, and which outputs the pure optical wave generated by the extraction means, a phase comparator also receiving the second intermediate pure wave on a first input, and the pure optical wave generated by the extraction means on a second input through a second delay means, and outputting an electrical signal representing a phase modulation, an electrical signal output from the phase comparator being coupled to a modulation input of the phase modulator.

20. Regenerator according to claim 19, wherein the phase filter further comprises an amplifier into which the electrical signal from the phase comparator is input, this comparator being coupled to the phase modulator through this amplifier.

* * * * *

UNITED STATES PATENT AND TRADEMARK OFFICE
CERTIFICATE OF CORRECTION

PATENT NO. : 6,498,671 B1
DATED : December 24, 2002
INVENTOR(S) : Christopher Janz et al.

It is certified that error appears in the above-identified patent and that said Letters Patent is hereby corrected as shown below:

<u>Title page,</u>
Item [75], Inventors, "Fabrice Devaux, Marghouge (FR)" should read
-- Fabrice Devaux, Montrouge (FR) -- and "Domonique Chiaroni" to
-- Dominique Chiaroni --

Signed and Sealed this

Thirteenth Day of May, 2003

JAMES E. ROGAN
*Director of the United States Patent and Trademark Office*